(12) United States Patent
Kitashou et al.

(10) Patent No.: US 10,325,345 B2
(45) Date of Patent: Jun. 18, 2019

(54) DEVICE FOR PERFORMING IMAGE TRANSFORMATION PROCESSING AND METHOD THEREOF

(71) Applicant: CANON KABUSHIKI KAISHA, Tokyo (JP)

(72) Inventors: Tetsurou Kitashou, Tokyo (JP); Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 15/486,136

(22) Filed: Apr. 12, 2017

(65) Prior Publication Data
US 2017/0301059 A1    Oct. 19, 2017

(30) Foreign Application Priority Data

Apr. 15, 2016  (JP) ................................. 2016-082330

(51) Int. Cl.
| | |
|---|---|
| *G06K 9/40* | (2006.01) |
| *G06K 9/32* | (2006.01) |
| *H04N 9/64* | (2006.01) |
| *H04N 5/232* | (2006.01) |
| *H04N 3/23* | (2006.01) |
| *G06T 3/00* | (2006.01) |

(Continued)

(52) U.S. Cl.
CPC .............. *G06T 3/00* (2013.01); *G06T 3/0093* (2013.01); *G06T 5/006* (2013.01); *G06T 7/73* (2017.01)

(58) Field of Classification Search
USPC ........... 382/293, 275; 348/246, 333.12, 746; 353/70; 345/647
See application file for complete search history.

(56) References Cited

U.S. PATENT DOCUMENTS

| | | | | |
|---|---|---|---|---|
| 6,473,536 | B1 * | 10/2002 | Chiba ..................... | G06T 11/00 345/630 |
| 8,380,011 | B2 * | 2/2013 | Zhang ..................... | G06T 3/403 348/240.1 |

(Continued)

FOREIGN PATENT DOCUMENTS

JP    4657367 B2    3/2011

OTHER PUBLICATIONS

Kobayashi, Reiichi, Ishii, Eisaku, "Improved Projector Functions Based on System Linkage with PC", NEC Technical Journal, vol. 64, No. 3, pp. 80 to 83.

*Primary Examiner* — Kathleen Y Dulaney
(74) *Attorney, Agent, or Firm* — Canon U.S.A., Inc. IP Division

(57) ABSTRACT

An image processing device that transforms an image includes a storage unit configured to store coordinate values in a coordinate system of a pre-transformed image, each of the coordinate value corresponding to a grid point in a coordinate system of a transformed image, a selection unit configured to select a grid point in the vicinity of a target pixel in the transformed image, a calculation unit configured to refer to the pre-transformed coordinate value, corresponding to the selected grid point and stored in the storage unit, and to calculate a pre-transformed coordinate value corresponding to the target pixel, using the referred coordinate value, and an output unit configured to output a pixel value of the coordinate value calculated in the pre-transformed image, as a pixel value of the target pixel in the transformed image.

7 Claims, 9 Drawing Sheets

(51) Int. Cl.
   *G06T 7/73*   (2017.01)
   *G06T 5/00*   (2006.01)

(56) References Cited

U.S. PATENT DOCUMENTS

| | | | | |
|---|---|---|---|---|
| 9,224,321 B2* | 12/2015 | Tamura | ................ | G09G 5/00 |
| 9,443,294 B2* | 9/2016 | Sumiyoshi | ............ | G09G 3/001 |
| 9,756,303 B1* | 9/2017 | De La Cruz | ........ | H04N 9/3194 |
| 2002/0196354 A1* | 12/2002 | Chang | ................ | H04N 5/2176 |
| | | | | 348/246 |
| 2004/0165786 A1* | 8/2004 | Zhang | ................ | G06K 9/32 |
| | | | | 382/276 |
| 2005/0078879 A1* | 4/2005 | Sakurai | ............ | G06T 3/0006 |
| | | | | 382/275 |
| 2005/0190986 A1* | 9/2005 | Sakurai | ............ | G06T 3/0006 |
| | | | | 382/275 |
| 2005/0213847 A1* | 9/2005 | Takane | ............ | H04N 5/217 |
| | | | | 382/275 |
| 2008/0267516 A1* | 10/2008 | Chang | ............ | H04N 19/597 |
| | | | | 382/236 |
| 2009/0324131 A1* | 12/2009 | Tong | ............ | G06T 7/75 |
| | | | | 382/281 |
| 2010/0021080 A1* | 1/2010 | Tamura | ............ | H04N 9/3185 |
| | | | | 382/275 |
| 2010/0097502 A1* | 4/2010 | Hagiwara | ............ | G06T 5/006 |
| | | | | 348/241 |
| 2011/0141321 A1* | 6/2011 | Tang | ............ | G06T 5/006 |
| | | | | 348/240.99 |
| 2011/0267483 A1* | 11/2011 | Kanamori | ............ | G06T 1/00 |
| | | | | 348/220.1 |
| 2015/0085149 A1* | 3/2015 | Tsubaki | ............ | H04N 5/23277 |
| | | | | 348/208.4 |
| 2015/0174925 A1* | 6/2015 | Motoyanagi | ............ | G06T 7/60 |
| | | | | 347/218 |
| 2015/0302560 A1* | 10/2015 | Sumiyoshi | ............ | G09G 3/001 |
| | | | | 382/203 |
| 2016/0071238 A1* | 3/2016 | Kimura | ............ | H04N 5/23238 |
| | | | | 348/36 |
| 2017/0289493 A1* | 10/2017 | Kojima | ............ | H04N 9/3185 |

\* cited by examiner

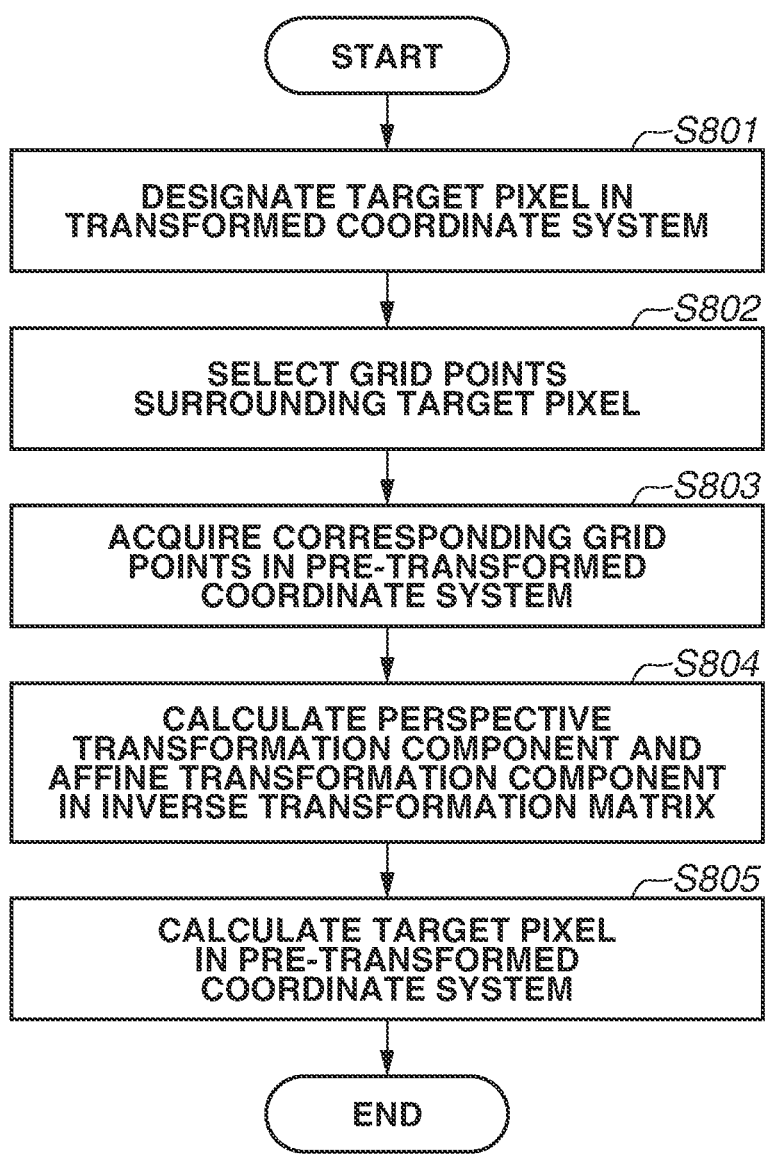

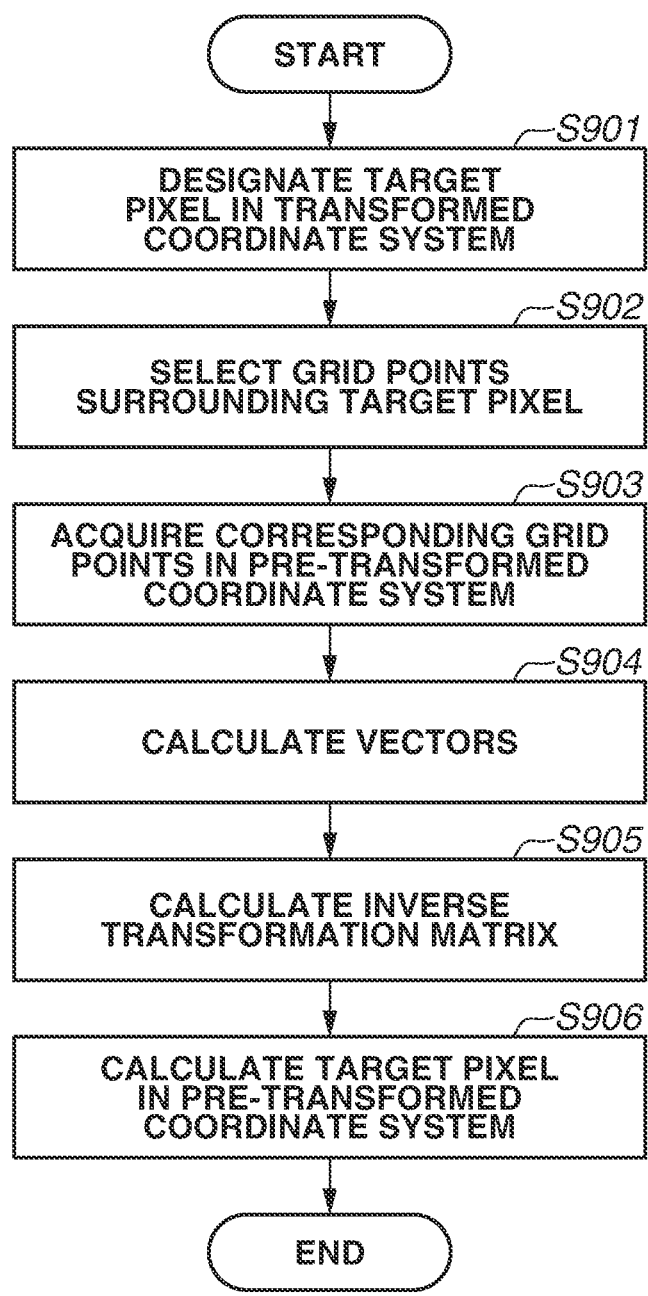

DEVICE FOR PERFORMING IMAGE TRANSFORMATION PROCESSING AND METHOD THEREOF

BACKGROUND

Field of the Disclosure

The present disclosure relates to image transformation processing executed in a camera, a printer, a projector, and the like. Specific examples of the image transformation processing include scaling processing such as enlargement and reduction, affine transformation processing such as rotation, keystone correction processing, barrel distortion correction processing, and pincushion distortion correction processing.

Description of the Related Art

In image processing devices, image transformation processing is required in many cases. For example, image transformation processing known as keystone correction processing is executed in projector products. Various other types of image transformation processing are required in a field of image/video processing. Specific examples of the various types of required transformation processing include scaling such as enlargement and reduction, affine transformation such as rotation, lens distortion correction, barrel distortion correction, pincushion distortion correction, and correction of distortion generated when projected on a circular/rectangular column by a projector. Any of these types of image transformation processing is achieved by conversion of the coordinates obtained before and after the transformation. Generally, the coordinates in the transformed image are converted into the coordinates in the pre-transformed image for simplifying the calculation.

For example, this is achieved with a method discussed in Japanese Patent No. 4657367. The method includes dividing a transformed coordinate system into grids and calculating information indicating which coordinates in the pre-transformed coordinate system each apex of a grid corresponds to. The calculation method in this processing differs depending on the application. For example, as keystone correction applied to a projector, there is a known calculation method in which a correspondence relation between an apex of a grid before transformation and an apex of a grid after transformation is calculated based on an installation angle of a casing thereof. Although there are other various calculation methods for different applications, they will be omitted herein.

The transformed coordinates are converted into the pre-transformed coordinates for coordinates other than those at apexes, based on the correspondence relation between the apexes of a grid in the transformed coordinate system and the apex of a grid in the pre-transformed coordinate systems obtained by the processing described above. More specifically, FIG. 4 in Japanese Patent No. 4657367 illustrates a method of calculating the pre-transformed coordinates corresponding to arbitrary transformed coordinates through linear interpolation using the coordinates of the four points of a grid after the transformation and the four points of the grid before the transformation as an input. The linear interpolation involves a small calculation amount and thus the method can be implemented with hardware, whereby high-speed processing can be achieved.

The distortion to be corrected by the transformation processing is projective distortion generated due to, for example, an angle between the normal line of an object and the normal line of a sensor in a case of cameras and an angle between an optical axis of a lens and a screen surface in a case of projectors. On the other hand, according to the above-described method, coordinates within the grid are calculated by performing liner interpolation, which means that coordinates on the projection plane are calculated linearly, so that calculation accuracy is deteriorated.

On the other hand, "Improved Projector Functions Based on System Linkage with PC", NEC Technical Journal, Vol. 64, No. 3, pp. 80 to 83, August 2011 discusses a software-based processing method in which the interpolation calculation in the grid is achieved with projective transformation. More specifically, the method includes calculating a parameter known as a homography matrix for converting the transformed coordinates into the pre-transformed coordinates and calculating the pre-transformed coordinates through the projective transformation using the homography matrix and the transformed coordinates as inputs. This method enables to achieve higher accuracy in distortion correction and the like, and thus proves the effectiveness of the coordinate interpolation based on the homography matrix.

High-speed and highly-accurate image transformation processing accommodating various transformations has been requested for image/video processing. In a general practice, hardware dedicated for each processing is implemented to achieve high-speed processing as in Japanese Patent No. 4657367 described above. However, with the method in Japanese Patent No. 4657367, calculation accuracy is deteriorated as described above. Supposing that the method discussed in the "Improved Projector Functions Based on System Linkage with PC", NEC Technical Journal, Vol. 64, No. 3, pp. 80 to 83, August 2011, is employed, a method for calculating coordinates through the projective transformation based on the homography matrix stored for each grid is considered. In such a case, the above-described effect of achieving higher coordinate calculation accuracy can be obtained.

However, this method creates a problem that an amount of data increases as a result of setting the homography matrix, used in the software processing, in hardware. More specifically, the homography matrix for transformation of a single grid can be represented by a 3×3 matrix including a component on the third row and the third column having a fixed value (for example, 1.0), and thus includes eight parameters. To assure accuracy of the coordinate conversion, accuracy of each parameter needs to be maintained above a certain level and the interval between grids needs to be set to be within a certain distance. Further, the eight parameters, corresponding to the homography matrix, need to be stored for each grid. As a result, a large amount of data on the parameters is required.

Accordingly, there is a need to achieve high-speed and highly-accurate image transformation processing accommodating various types of transformation.

SUMMARY

According to an aspect of the present disclosure, an image processing device that converts an image includes a storage unit configured to store coordinate values in a coordinate system of a pre-transformed image, each of the coordinate values corresponding to a grid point in a coordinate system of a transformed image, a selection unit configured to select a grid point in the vicinity of a target pixel in the transformed image, a calculation unit configured to refer to a coordinate value in the pre-transformed image, corresponding to the selected grid point and stored in the storage unit, and to calculate a pre-transformed coordinate value corresponding to the target pixel, using the referred coordinate value, and an output unit configured to output a pixel value of the calculated pre-transformed coordinate value, as a pixel value of the target pixel in the transformed image.

Further features of the present disclosure will become apparent from the following description of exemplary embodiments with reference to the attached drawings.

BRIEF DESCRIPTION OF THE DRAWINGS

FIG. 8 is a flowchart illustrating a processing procedure according to one or more aspects of the present disclosure.

FIG. 9 is a flowchart illustrating a processing procedure according to one or more aspects of the present disclosure.

DESCRIPTION OF THE EMBODIMENTS

Exemplary embodiments of the present disclosure are described below with reference to the drawings.

Figure 5:
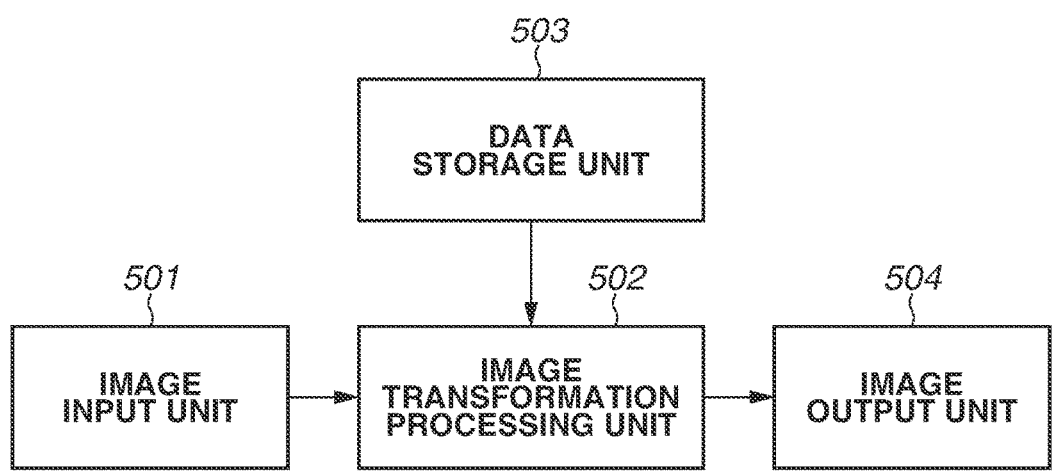
FIG. 5 is a block diagram illustrating a functional configuration of an image processing device according to one or more aspects of the present disclosure.

A first exemplary embodiment is described below. FIG. 5 is a block diagram illustrating a functional configuration of an image processing device according to the present exemplary embodiment. An image input unit 501 inputs image data from an image capturing apparatus and the like. An image transformation processing unit 502 uses a parameter and a table, stored in a data storage unit 503, to execute transformation processing on the input image data. An image output unit 504 outputs transformed image data to a display apparatus, a printing apparatus, or the like. The image input unit 501 and the image output unit 504 can transmit and receive image data to and from another apparatus through a network or the like.

Figure 6:
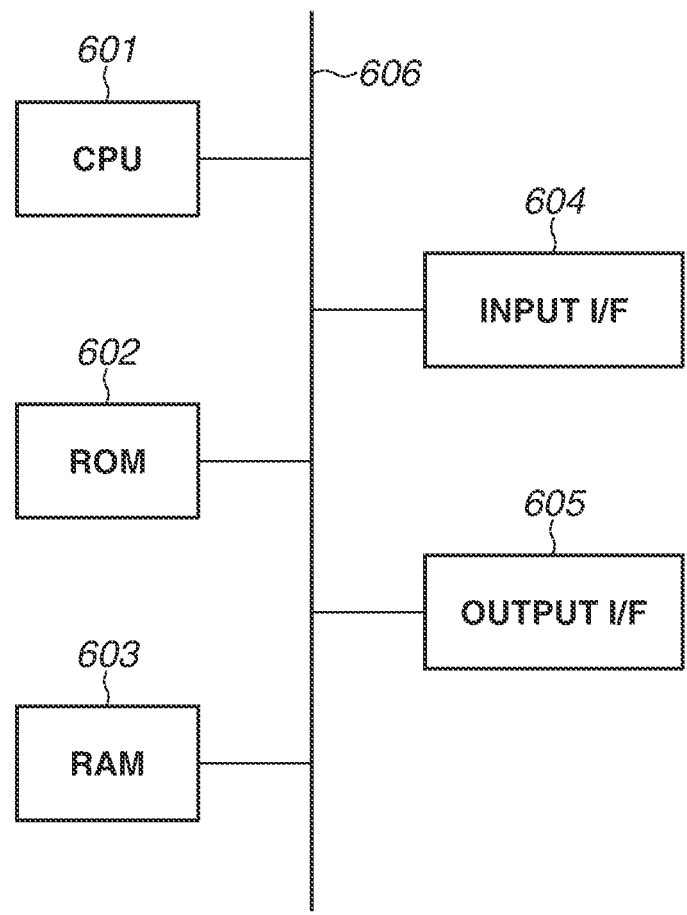
FIG. 6 is a block diagram illustrating a hardware configuration of the image processing device according to one or more aspects of the present disclosure.

FIG. 6 is a block diagram illustrating a hardware configuration of an image processing device according to the present exemplary embodiment. In FIG. 6, a central processing unit (CPU) 601 performs overall control on devices connected through a bus 606. The CPU 601 reads and executes a program stored in a read only memory (ROM) 602. Processing programs, device drivers, and an operating system (OS) according to the present exemplary embodiment are stored in the ROM 602 or an external storage device (not illustrated), and are temporarily stored in a random access memory (RAM) 603 to be executed by the CPU 601 as appropriate. The RAM 603 can be used as a temporary storage area for various types of data. In particular, a static RAM (SRAM) is suitable as a memory that stores a parameter and a table used as a reference in image transformation processing described below. An input interface (I/F) 604 inputs an input signal, from an external device (such as a display device and an operation device), in a format that can be processed by the image processing device. An output I/F 605 outputs an output signal, to an external device (such as the display device), in a format that can be processed by the external device.

Figure 1:
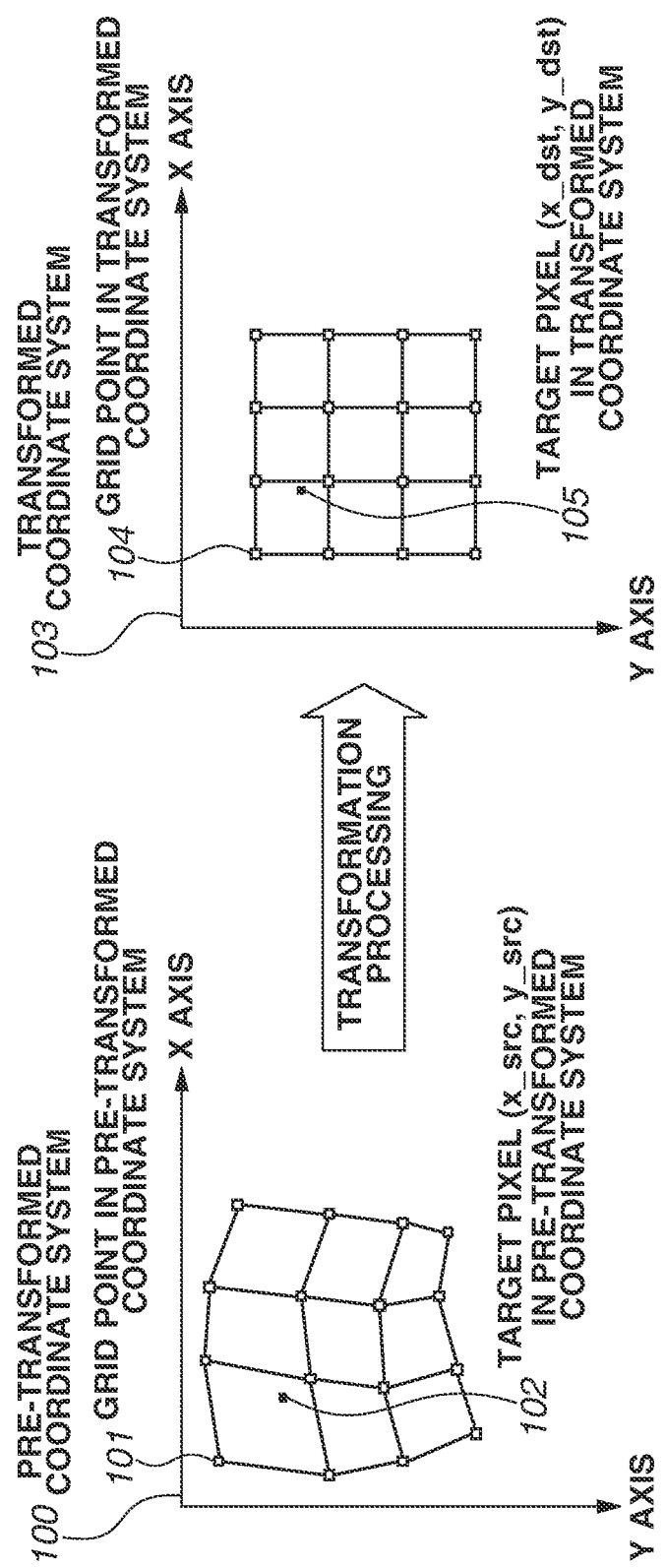
FIG. 1 is a diagram illustrating a corresponding relationship between coordinates before and after image transformation processing according to one or more aspects of the present disclosure.

Processing according to the first exemplary embodiment is described in detail. FIG. 1 illustrates a corresponding relationship between coordinates in a pre-transformed image and coordinates in a transformed image obtained by performing the image transformation processing. A pre-transformed coordinate system 100 is a coordinate system including the pre-transformed image. The pre-transformed (pre-converted) image is an image used as an input in image transformation processing. A transformed (converted) coordinate system 103 is a coordinate system including an image obtained by performing the transformation processing on the input image. The image transformation processing can be achieved mainly by acquiring pixels adjacent to coordinates in the pre-transformed image, which correspond to pixels in the transformed image, and performing interpolation calculation on the pixel values in the transformed coordinate system 103. An example of the processing for acquiring pixels and performing interpolation calculation includes known processing such as bilinear interpolation and bicubic interpolation.

The processing for transforming the image of the pre-transformed coordinate system 100 into the image of the transformed coordinate system 103 can be simplified with the transformed coordinate system 103 used as a reference. Thus, in the present exemplary embodiment, the processing is executed with the transformed coordinate system 103 divided into rectangular grid cells. More specifically, the transformed coordinate system is divided into a grid pattern, and an apex of each grid is set as a grid point 104 in the transformed coordinate system 103. A coordinate value of a point in the pre-transformed coordinate system 100, corresponding to each of the grid points 104 in the transformed coordinate system 103, is set as a grid point 101 in the pre-transformed coordinate system 100. The grid points 104 in the transformed coordinate system 103 are information determined in advance based on a grid interval and reference coordinates. Similarly, the grid points 101 in the pre-transformed coordinate system 100 are information determined in advance in accordance with an arbitrary type of transformation.

The transformed coordinate system 103 includes a target pixel (x_dst,y_dst) 105, and the pre-transformed coordinate system 100 includes a target pixel (x_src,y_src) 102 as the corresponding point in the pre-transformed coordinate system 100. The present exemplary embodiment is directed to conversion of the target pixel (x_dst,y_dst) 105 in the transformed coordinate system 103 into the target pixel (x_src,y_src) 102 in the pre-transformed coordinate system 100.

Figure 2:
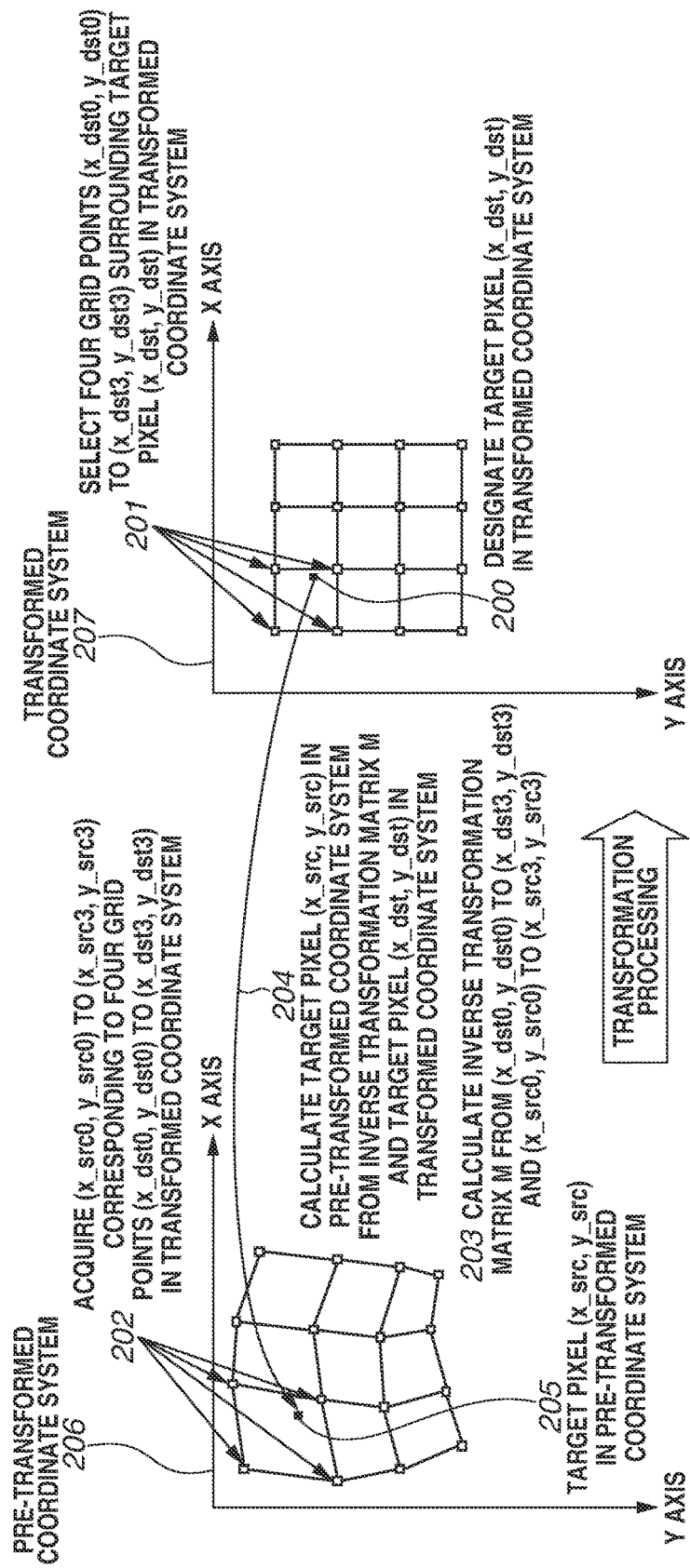
FIG. 2 is a diagram illustrating processing according to one or more aspects of the present disclosure.
Figure 7:
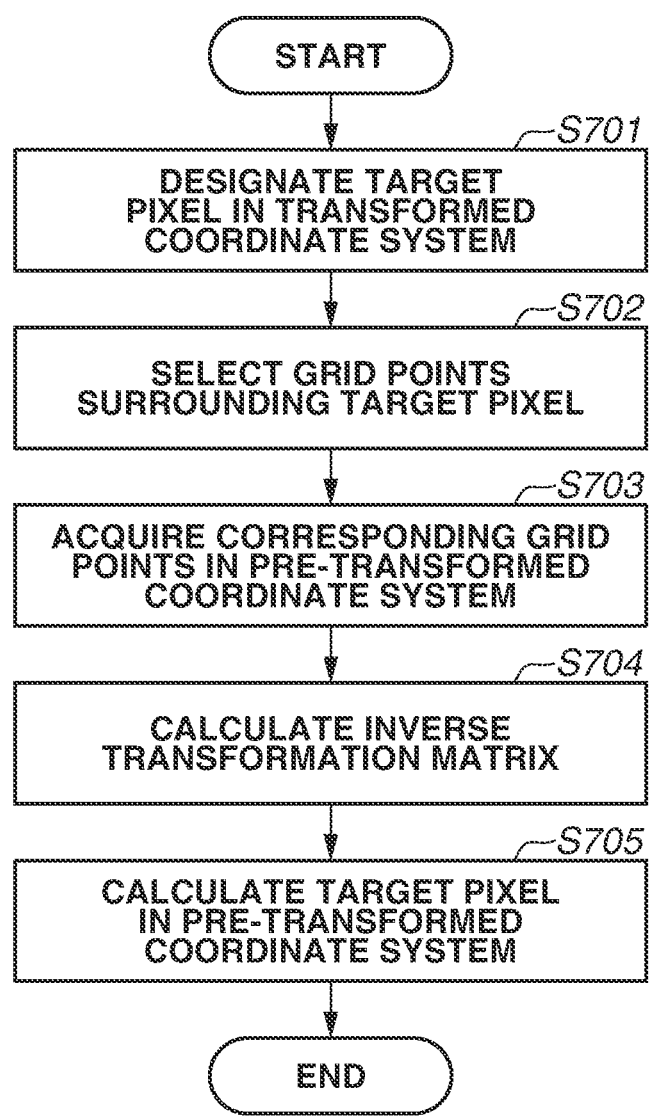
FIG. 7 is a flowchart illustrating a processing procedure according to one or more aspects of the present disclosure.

Next, specific exemplary embodiments are described. FIG. 2 is a diagram illustrating processing according to the first exemplary embodiment. FIG. 7 is a flowchart illustrating a processing procedure of the processing. The image transformation processing is executed by converting the pixels in a transformed coordinate system 207 into the pixels, in a pre-transformed coordinate system 206, one by one. In step S701 as the first step in the conversion processing, the CPU 601 designates the target pixel (x_dst,y_dst) 105 (i.e., conversion target) in a transformed coordinate system 207 is designated (200). For example, the designation is executed by performing scanning on the transformed coordinate system 207 in accordance with a raster order. More specifically, in such a method for scanning an image, x coordinate value is incremented one by one in an X-axis direction from an origin (0,0), the x coordinate value is initialized to be 0 each time the scanning reaches an end of the image in the width direction, and then a y coordinate value is incremented one by one.

Next, in step S702, as grid points surrounding the target pixel (x_dst,y_dst), four grid points (x_dst0,y_dst0) to (x_dst3,y_dst3) adjacent to each other in vertical and horizontal directions in the transformed coordinate system 207 are selected (201). The processing described above is executed with the following formulae under a condition that the grid cell has a square shape: (x_dst0,y_dst0)=(x_dst−(x_dst%GRID_INTERVAL),y_dst−(y_dst%GRID_INTERVAL)), (x_dst1,y_dst1)=(x_dst+GRID_INTERVAL,y_dst), (x_dst2,y_dst2)=(x_dst,y_dst+GRID_INTERVAL), and (x_dst3,y_dst3)=(x_dst+GRID_INTERVAL,y_dst+GRID_INTERVAL),
where GRID_INTERVAL represents the interval, and % represents residue calculation.

Next, in step S703, (x_src0,y_src0) to (x_src3,y_src3) corresponding to the four grid points (x_dst0,y_dst0) to (x_dst3,y_dst3) in the transformed coordinate system 207 are acquired (202). This processing is implemented by referring to a table stored in advance in a memory. The table indicates the association between the grid points in the transformed coordinate system and information of the grid points in the pre-transformed coordinate system.

Then, in step S704, an inverse transformation matrix M is calculated from the grid points (x_dst0,y_dst0) to (x_dst3, y_dst3) and the grid points (x_src0,y_src0) to (x_src3, y_src3) (203). The inverse transformation matrix M is first obtained as a nomography matrix defined as follows:

$$M = \begin{bmatrix} a & b & c \\ d & e & f \\ g & h & 1 \end{bmatrix}.$$

Thus, the gird points (x_dst0,y_dst0) and (x_src0,y_src0) are associated with each other with a formula of projective transformation known as planar projection transformation, whereby the following formulae holds true:

$$M = \begin{bmatrix} x\_dst0 \\ y\_dst0 \\ 1 \end{bmatrix} = \begin{bmatrix} a*x\_dst0 + b*y\_dst0 + c \\ d*x\_dst0 + e*y\_dst0 + f \\ g*x\_dst0 + h*y\_dst0 + 1 \end{bmatrix},$$

$$x\_src0 = \frac{a*x\_dst0 + b*y\_dst0 + c}{g*x\_dst0 + h*y\_dst0 + 1}, \text{ and}$$

$$y\_src0 = \frac{d*x\_dst0 + e*y\_dst0 + f}{g*x\_dst0 + h*y\_dst0 + 1}.$$

In this manner, eight relational equations are derived for x-y pairs of the four grid points, whereby parameters (=a to h) of the inverse transformation matrix M can be obtained by solving the equations as simultaneous equations with eight unknowns.

Thus, information required for the inverse transformation is obtained. In step S705, the target pixel (x_src,y_src) in the pre-transformed coordinate system 206 is calculated from the inverse transformation matrix M and the target pixel (x_dst,y_dst) in the transformed coordinate system 207 (204). The processing is represented by the following formulae:

$$x\_src = \frac{a*x\_dst + b*y\_dst + c}{g*x\_dst + h*y\_dst + 1}, \text{ and}$$

$$y\_src = \frac{d*x\_dst + e*y\_dst + f}{g*x\_dst + h*y\_dst + 1}.$$

Thus, the coordinates of the target pixel (x_src,y_src) 205 in the pre-transformed coordinate system 206 can be obtained. This processing is executed on each set of coordinates of the transformed coordinate system 207, whereby the image transformation processing is executed by adopting the pixel value of each set of coordinates after the transformation for the pixel value of the corresponding set of coordinates after the transformation.

According to the present exemplary embodiment, high-speed and highly-accurate image transformation processing accommodating various types of transformations can be achieved with a smaller data amount of parameters than with conventional configurations.

More specifically, according to the technique discussed in "Improved Projector Functions Based on System Linkage with PC", NEC Technical Journal, Vol. 64, No. 3, pp. 80 to 83, August 2011, eight parameters are required for each grid point, whereas the image transformation processing can be achieved by using two parameters for each grid point (X and y coordinates of each grid point before the transformation) according to the present exemplary embodiment. Although the parameters are essentially different from each other and thus cannot be directly compared with each other, the data amount can be reduced to one fourth of that in the conventional case assuming that each parameter is expressed by a single precision floating number.

Figure 3:
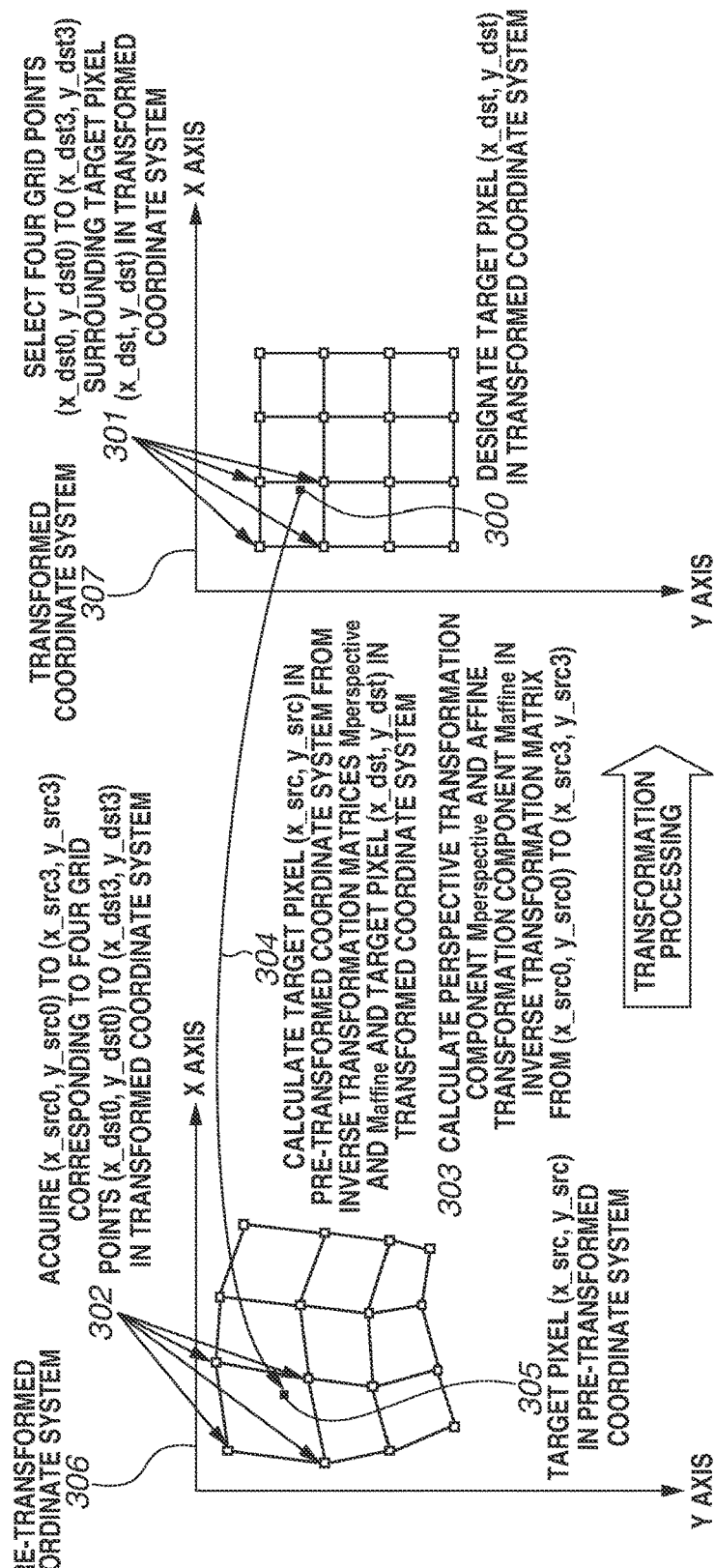
FIG. 3 is a diagram illustrating processing according to one or more aspects of the present disclosure.

Next, a second exemplary embodiment is described. FIG. 3 is a diagram illustrating processing in the second exemplary embodiment. FIG. 8 is a flowchart illustrating a processing procedure of the processing. Processing 300 to 302 in FIG. 3 (steps S801 to S803 in FIG. 8) is the same as the processing 200 to 202 (steps S701 to S703 in FIG. 7) and thus will not be described. In step S804, a projective transformation component $M_{perspective}$ and an affine transformation component $M_{affine}$ in the inverse transformation matrix M are calculated from the coordinates (x_src0, y_src0) to (x_src3,y_src3) (S303). The processing is represented by the following formulae:

$$T_{230}=(x_{src0}-x_{src2})*(y_{src0}-y_{src3})-(y_{src3}-y_{src2})*(x_{src0}-x_{src3}),$$

$$T_{012}=(x_{src1}-x_{src0})*(y_{src2}-y_{src1})-(y_{src1}-y_{src0})*(x_{src2}-x_{src1}),$$

$$T_{012}=(x_{src2}-x_{src1})*(y_{src3}-y_{src2})-(y_{src2}-y_{src1})*(x_{src3}-x_{src2}),$$

$$M_{perspective} = \begin{bmatrix} T_{230} & 0 & 0 \\ 0 & T_{012} & 0 \\ T_{230}-T_{123} & T_{012}-T_{123} & T_{123} \end{bmatrix}, \text{ and}$$

-continued $$M_{affine} = \begin{bmatrix} x\_src1 - x\_src0 & x\_src3 - x\_src0 & x\_src0 \\ y\_src1 - y\_src0 & y\_src3 - y\_src0 & y\_src0 \\ 0 & 0 & 1 \end{bmatrix}.$$

In the inverse transformation matrix M, a relationship of $M = M_{affine} * M_{perspective}$ holds true.

Next, in step S805, the target pixel (x_src,y_src) in a pre-transformed coordinate system 306 is calculated from the inverse transformation matrices $M_{perspective}$ and $M_{affine}$ and the target pixel (x_dst,y_dst) in a transformed coordinate system 307 (304). This processing is achieved by utilizing the following formulae. The calculation is performed with the inverse transformation matrix M divided into the two components $M_{perspective}$ and $M_{affine}$, whereby the amount of calculation can be reduced compared with the processing 204 for achieving the same function.

$$x\_src_{perspective} = \frac{T_{230} * x\_dst}{(T_{230} - T_{123}) * x_{dst} + (T_{012} - T_{123}) * y\_dst + 1},$$

$$y\_src_{perspective} = \frac{T_{012} * y\_dst}{(T_{230} - T_{123}) * x_{dst} + (T_{012} - T_{123}) * y\_dst + 1},$$

$x\_src = x\_src_{perspective} * (x\_src1 - x\_src0) + y\_src_{perspective} * (x\_src3 - x\_src0) + x\_src0$, and $y\_src = x\_src_{perspective} * (y\_src1 - y\_src0) + y\_src_{perspective} * (y\_src3 - y\_src0) + y\_src0$.

Figure 4:
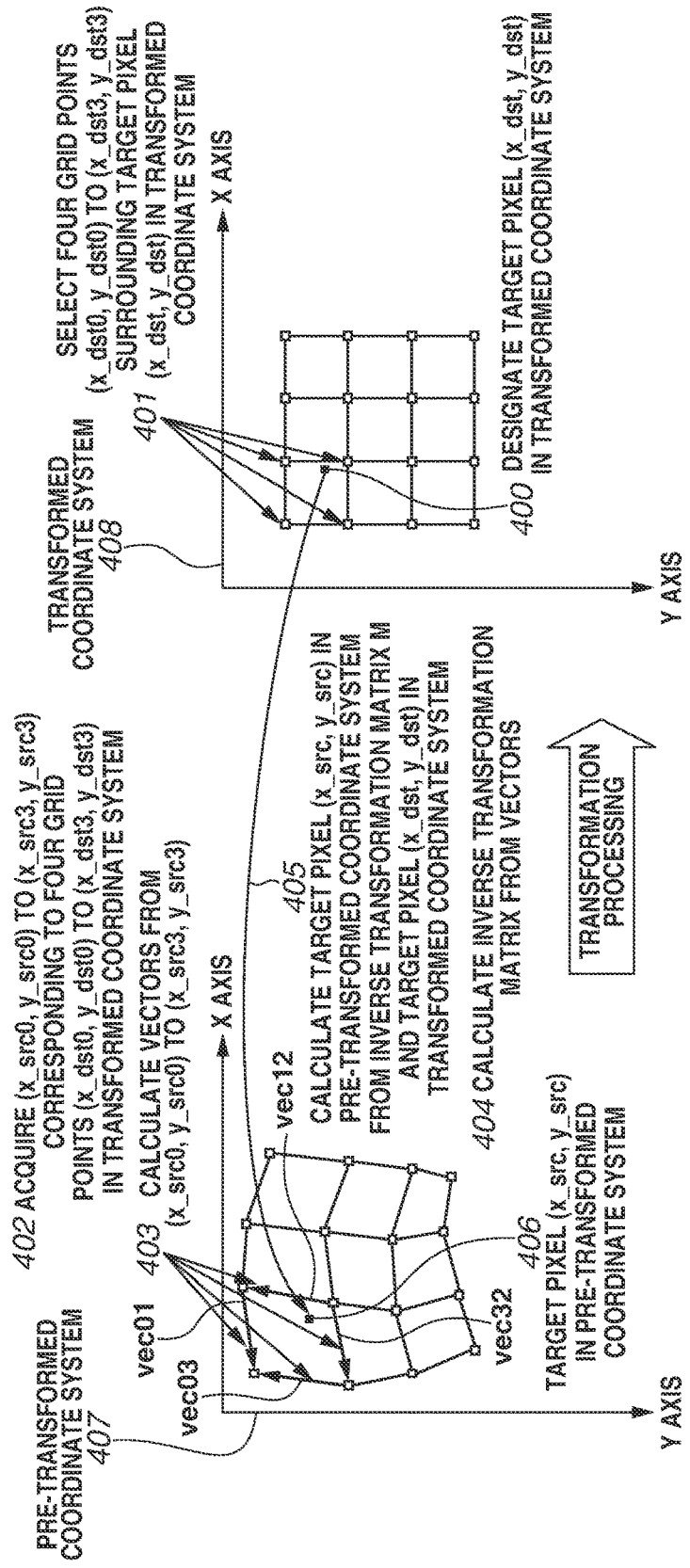
FIG. 4 is a diagram illustrating processing according to one or more aspects of the present disclosure.

Next, a third exemplary embodiment is described. FIG. 4 is a diagram illustrating processing in the third exemplary embodiment. FIG. 9 is a flowchart illustrating a processing procedure of the processing. Processing 400 to 402 in FIG. 4 (steps S901 to S903 in FIG. 9) is the same as the processing 200 to 202 (steps S701 to S703 in FIG. 7) and thus will not be described. In step S904, respective vectors are calculated from the coordinates (x_src0,y_src0) to (x_src3,y_src3) (403). The respective directions of the vectors are illustrated in processing 403 of FIG. 4. This processing is represented by the following formulae:

$$vec01 = \frac{x\_src0 - x\_src1}{y\_src0 - y\_src1},$$

$$vec03 = \frac{x\_src0 - x\_src3}{y\_src0 - y\_src3},$$

$$vec12 = \frac{x\_src1 - x\_src2}{y\_src1 - y\_src2}, \text{ and}$$

$$vec32 = \frac{x\_src3 - x\_src2}{y\_src3 - y\_src2}.$$

Then, in step S905, the inverse transformation matrix M is calculated from each of the vectors (404). This processing is represented by the following formulae:

$$h = \frac{vec12 \wedge vec03}{vec12 \wedge vec32} = \frac{|vec12[0] * vec03[1] - vec12[1] * vec03[0]|}{|vec12[0] * vec32[1] - vec12[1] * vec32[0]|}, \text{ and}$$

$$M = \begin{bmatrix} x\_src1 - x\_src0 + g*x\_src1 & x\_src3 - x\_src0 + g*x\_src3 & x\_src0 \\ y\_src1 - y\_src0 + g*y\_src1 & y\_src3 - y\_src0 + g*y\_src3 & y\_src0 \\ g & h & 1 \end{bmatrix},$$

Next, a fourth exemplary embodiment is described based on the third exemplary embodiment. In a configuration according to the present exemplary embodiment, data on components g and h in the third exemplary embodiment are calculated in advance, and the values are stored for each grid point. Thus, the calculation for the components g and h involving division can be performed with software. In a case where the division is performed with hardware using a dedicated circuit, the circuit size increases. On the other hand, in a case where the division is performed by software, the division function of the CPU 601 can be shared, whereby a smaller circuit size can be achieved.

In the configuration described above, the data on the g and h components is stored for each grid point. This means that two pieces of data on the components g and h need to be stored in addition to the data on the coordinates (src_x, src_y), so that the number of parameters required to be stored for each grid point should be doubled. However, because the values of the components g and h generally take small values after the decimal point and thus can be represented with a fixed point format with no integer portion. As a result, the amount of data to be stored is not doubled. For example, the coordinate data is stored in 32 bits (=1 bit for the sign, 16 bits for integers, and 15 bits for decimals), and the g and h components are stored in 16 bits (=1 bit for the sign, and 15 bits for decimals). In this case, the amount of data to be stored is 96 bits (=32 bits×2+16 bits×2) in the fourth exemplary embodiment, whereas the amount of data to be stored is 64 bits (=32 bits×2) in the third exemplary embodiment. In this manner, the fourth exemplary embodiment can be implemented with the data amount increased by 1.5 times (=96/64) instead of being doubled.

In the cases described in the first to the fourth exemplary embodiments, the transformed coordinate system is divided into rectangular shapes to form grids. Alternatively, the pre-transformed coordinate system may be divided into rectangular shapes to form grids.

With the exemplary embodiments described above, high-speed and highly-accurate image transformation processing accommodating various types of transformation can be achieved with a smaller amount of data on parameters.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-082330, filed Apr. 15, 2016, which is hereby incorporated by reference herein in its entirety.

What is claimed is:

1. An image processing device that transforms an image, the image processing device comprising:
    one or more processors; and
    a memory that stores instructions which, when executed by the one or more processors, causes the image processing device to function as:
    a storage unit configured to store coordinate values in a coordinate system of a pre-transformed image, each of the coordinate values corresponding to a grid point in a coordinate system of a transformed image;
    a selection unit configured to select a grid point in a vicinity of a target pixel in the transformed image;
    a calculation unit configured to refer to a pre-transformed coordinate value, corresponding to the selected grid point and stored in the storage unit, to calculate a homography matrix based on the selected grid point and the referred coordinate value, and to calculate a pre-transformed coordinate value corresponding to the target pixel, using the homography matrix,
    wherein the calculation unit generates vectors by connecting coordinate values of a plurality of the grid points, and to calculate the homography matrix using the vectors; and
    an output unit configured to output a pixel value of the coordinate value calculated in the pre-transformed image, as a pixel value of the target pixel in the transformed image.

2. The image processing device according to claim 1, wherein the calculation unit is configured to calculate an outer product of a plurality of the vectors, and to calculate the homography matrix using the outer product.

3. The image processing device according to claim 1,
    wherein the storage unit is configured to store a component of the homography matrix for the selected grid point, and
    wherein the calculation unit is configured to calculate the homography matrix using the pre-transformed coordinate value corresponding to the selected grid point and the component stored for the selected grid point.

4. The image processing device according to claim 3, wherein the storage unit is configured to store the component in a fixed-point format with no integer portion.

5. The image processing device according to claim 3, wherein the selection unit is configured to select four grid points adjacent to the target pixel in vertical and horizontal directions.

6. An image processing method for transforming an image, the image processing method comprising:
    inputting an image;
    selecting a grid point in a vicinity of a target pixel in a transformed image;
    calculating, by referring to a pre-transformed coordinate value corresponding to the selected grid point and stored in a storage unit, a homography matrix based on the selected grid point and the referred coordinate value, and calculating a pre-transformed coordinate value corresponding to the target pixel using the homography matrix,
    wherein storage unit is configured to store coordinate values in a pre-transformed coordinate system, each of the stored coordinate values corresponding to a grid point in a transformed coordinate system; and
    wherein calculating further generates . . . vectors, and
    outputting a pixel value of the coordinate value calculated in a pre-transformed image, as a pixel value of the target pixel in the image transformed image.

7. A non-transitory computer-readable storage medium storing therein a program for causing a computer to function for transforming an image, the computer readable storage medium comprising:
    a storage unit configured to store coordinate values in a coordinate system of a pre-transformed image, each of the coordinate values corresponding to a grid point in a coordinate system of a transformed image;
    a selection unit configured to select a grid point in a vicinity of a target pixel in the transformed image;
    a calculation unit configured to refer to a pre-transformed coordinate value, corresponding to the selected grid point and stored in the storage unit, to calculate a homography matrix based on the selected grid point and the referred coordinate value, and to calculate a pre-transformed coordinate value corresponding to the target pixel, using the homography matrix,
    wherein the calculation unit generates vectors by connecting coordinate values of a plurality of the grid points, and to calculate the homography matrix using the vectors; and
    an output unit configured to output a pixel value of the coordinate value calculated in the pre-transformed image, as a pixel value of the target pixel in the transformed image.

* * * * *